INVENTOR
Harvey L. Ratliff Jr.

June 23, 1970 H. L. RATLIFF, JR 3,516,725
TWO-OCULAR PANORAMIC VIEWING DEVICE
Filed April 16, 1968 2 Sheets-Sheet 2

INVENTOR
Harvey L. Ratliff Jr.

United States Patent Office 3,516,725
Patented June 23, 1970

3,516,725
TWO-OCULAR PANORAMIC VIEWING DEVICE
Harvey L. Ratliff, Jr., Waldorf, Md., assignor to
Jetru Inc., Amarillo, Tex.
Filed Apr. 16, 1968, Ser. No. 721,841
Int. Cl. G02b 27/22
U.S. Cl. 350—131                                   5 Claims

ABSTRACT OF THE DISCLOSURE

A structural combination which enables flat or slightly cylindrical transparent slides or the equivalent thereof to be expanded into the equivalent of a substantially spherical virtual image surface which is enlarged some 12½ times, at the standard assumption of 10 inches from the eyes, to bring the peripheral rays of light into the eyes at some 145° (between 85° and 180°+) while retaining a resolution at the virtual image surface which is substantially sharp enough to be beneath the resolving power of the eye even when the slides are made from color film.

BACKGROUND AND SUMMARY OF THE INVENTION

The prior art is replete with panoramic viewing devices. However, the prior art falls short in that either the angle of view is not truly wide-angle as it is restricted to an angle of view of 85° or less (especially when 2″ x 2″ slides are used therewith), or if the angle of view does exceed 85°, the presented view is subjected to serious astigmatic abberrations and/or distortions. In addition, prior art attempts to increase the angle of view have involved complicated ocular systems and excessively large transparencies; still further, these systems, i.e. see U.S. Pat. 2,953,980, require a great deal of skill to merely mount the picture for viewing.

One of the objects of the present invention is to teach a viewing device which uses 2″ x 2″ slides as does the well known "Pana-vue" "Bi-lens" viewer made by "Sawyers Inc." However, whereas this well known "Bi-lens" viewer presents "Pana-vue" at angles actually less than some 30°, the present system can re-construct the presentation at angles of 145° and over with practically no distortion or astigmatism.

Another object of the present invention is to teach a viewing device which could be used with a telescopic type objective lens in the theatrical arrangement (with fisheye-type pictures upon the front screen of the theater) of my copending application Ser. No. 618,977, now U.S. Pat. 3,471,224 thereby avoiding the problem of making each device have different angles of convergence, while obvious insertions of polarizers enables the total stereoscopic aspect to be also included. With these polarizers the device as specifically set forth herein without the "telescopic type objective" could be used with "vectographic" slides for the stereo-effect in total, if desired.

Pincushion distortion at the virtual image "plane" or surface has always been present in simple-type oculars at wide-angles of view; however, heretofore this was thought only a bad disadvantage and nobody could see any benefit in deliberately making a viewer to create from a small flat (or slightly cylindrical as in my copending application Ser. No. 560,531 now U.S. Pat. 3,424,511) object plane a substantially spherical virtual image surface, in effect, with a deliberately predetermined amount of pincushion distortion. It was heretofore thought that any picture for use at this object plane would unquestionably have astigmatic aberration which is totally unacceptable even if the other distortions were eliminated or nullified.

SUMMARY OF INVENTION

It is therefore the primary object and summary of the present invention to deliberately make a viewer which creates, from a small substantially flat or slightly cylindrical object plane, a substantially spherical and greatly enlarged virtual image surface with a deliberately predetermined amount of pincushion distortion and to teach heretofore unexpected beneficial results therefrom, while keeping the total enlargement of commensurate size whereby the resolution is desirably sharp with reference to the original resolution of the transparency.

Other objects and advantages of my invention will become more apparent from a study of the following description taken with the accompanying drawings hereinafter.

DETAIL DESCRIPTION

Figure 1:
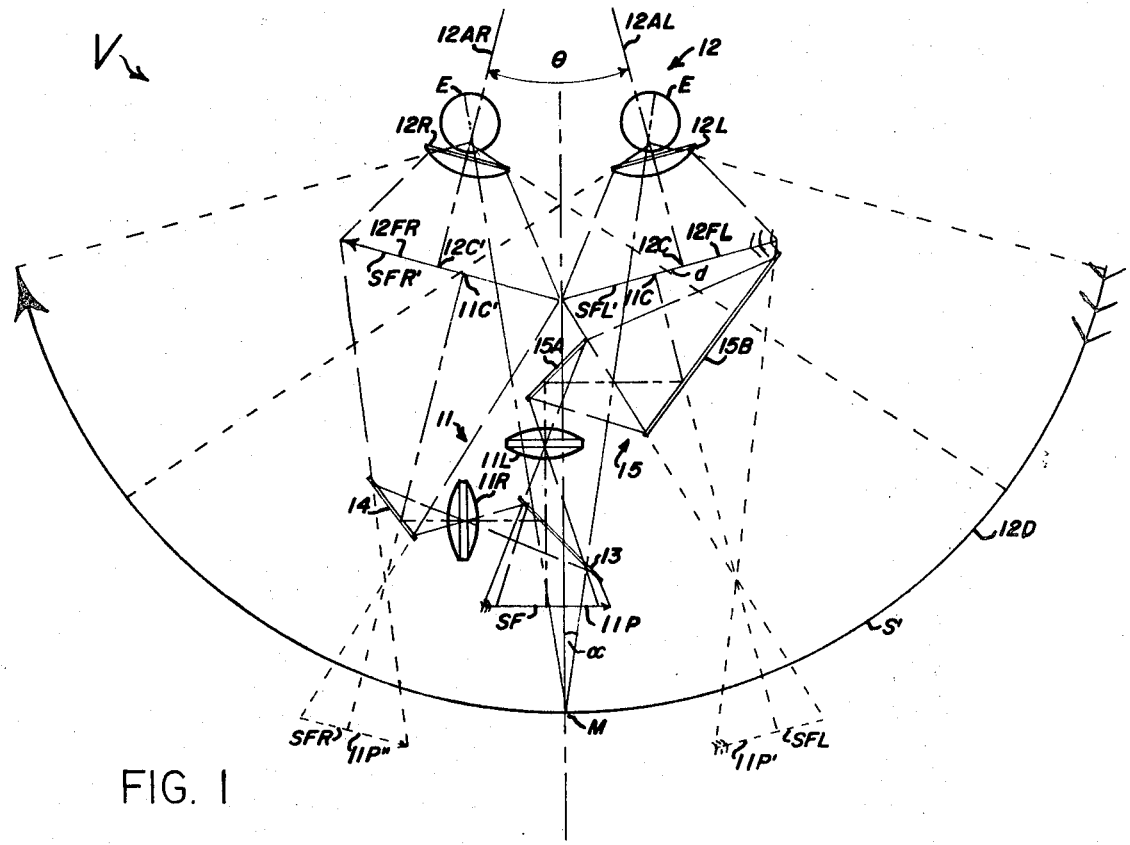
FIG. 1 is a diagrammatic drawing designed to illustrate the operation, result, and function of the supported elements of the invention.

Throughout the figures, the same reference character always indicates the same element of the invention.

Now, referring specifically to the figures. There is the housing 10 provided as shown. There is a lens means 11 supported by the housing at 10C having an illuminated object plane 11P. In this specific most contemplated embodiment shown, lens means 11 is composed of two, minor element, lenses 11L and 11R shown; however, a person of ordinary skill could, after reading the present disclosure, obviously design the device V (for use with, for example, super resolution "microfilm") such that the magnification of lens means 11 is of the order of 4 rather than 2 as in the embodiment shown and therefore place a single lens between object plane 11P and element 13 (described hereinafter). Also, in this most contemplated specific embodiment shown, object plane 11P is illuminated by way of diffusing screen 21 and any available light source outside the viewer, i.e. the sun; however, there are many equivalents to this, such as a diffuse artificial light placed inside the viewer V itself or the illumination could be from a television tube or a projector (as in my copending application Ser. No. 618,977, now U.S. Pat. 3,471,224 or my U.S. Pat. 3,379,489).

There is a beam splitting mirror means 13 supported by the housing at 10B which transmits approximately half the light rays from object plane 11P and reflects approximately the other half of the light rays from object plane 11P.

Figure 2:
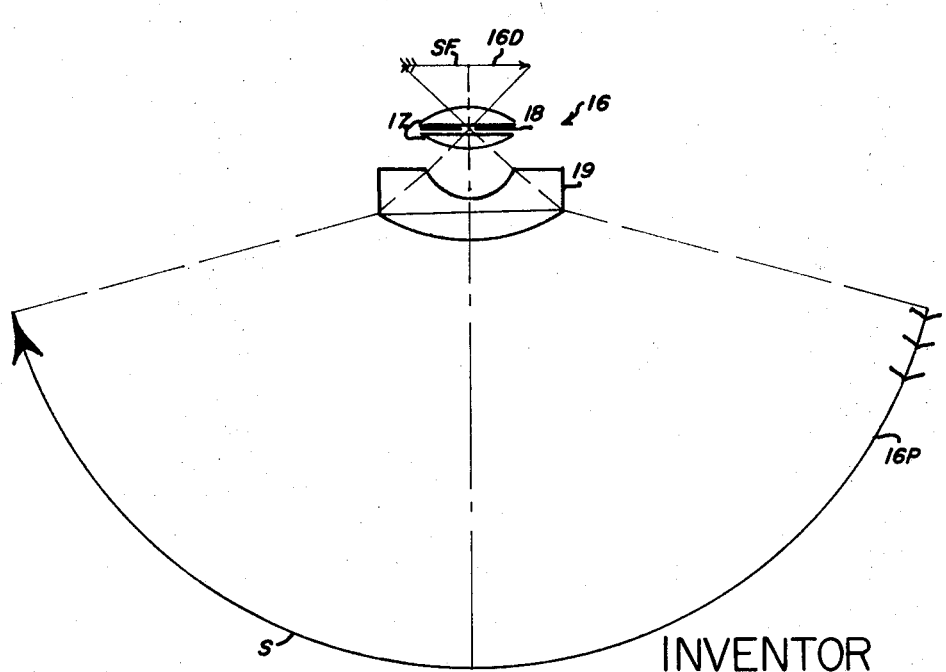
FIG. 2 is a diagrammatic drawing designed to illustrate a method of recording the type of pictures for ideal use with the present invention.
Figure 3:
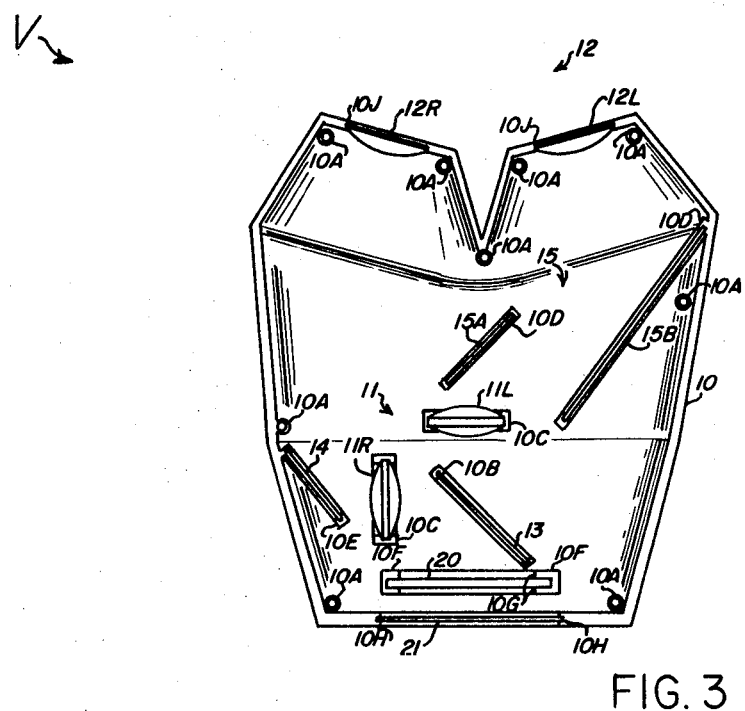
FIG. 3 is a plan view showing the bottom half of the housing supporting the elements of the present invention. The top half is not shown; however, its structure can be seen from FIG. 3 to be substantially a mirror reflection of the bottom half supporting the same elements.
Figure 4:
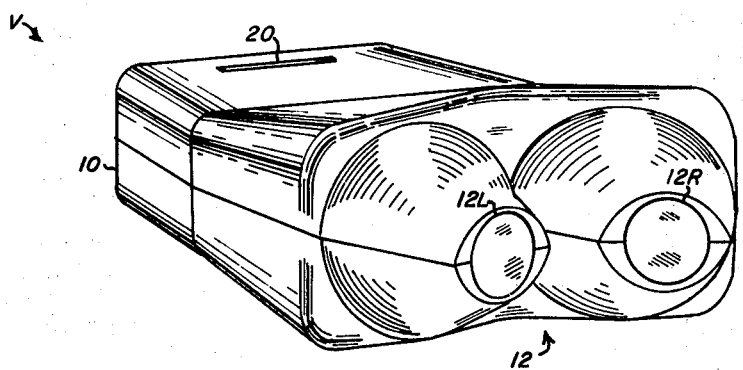
FIG. 4 is an isometric view of the most contemplated embodiment of the invention as it appears from the outside rear-left with both halves assembled in place to hold the interior elements as shown in FIG. 3.

There is a pair of wide-angle oculars 12, at 12L and 12R, supported at the rear of the housing at 10J which introduce a predetermined amount of pincushion distortion at their virtual image surface 12D upon a distortionless image at their respective focal planes 12FL and 12FR to substantially nullify a predetermined amount of fisheye-type barrel distortion at wide-angles in an image placed at the focal planes 12FL and 12FR, in that:

$$\phi \cong Ky \quad (1)$$

where: $\phi$ is the angle a ray entering an eye E makes with an optical axis, 12AL or 12AR, of one of oculars 12; y is the distance from optical center, 12C or 12C' respectively, of focal plane, 12FL or 12FR respectively, to the point of origin of said ray measured along 12FL or 12FR respectively; and K is a predetermined property of the ocular which has a predetermined value that is a substantial constant for valves of $\phi$ from 0° to wide-angle values. It is essential that the oculars are designed to closely achieve the relation of Equation 1 over a field of view of 85° (42.5° off the optical axis) or more (up to 180° plus), depending on how much more than 85° is desired. Examples of such oculars are the ones set forth in my copending applications Ser. No. 665,318, Ser. No. 618,977, and Ser No. 560,531, now U.S. Pat. 3,471,224. They could look similar to those in my U.S. Pat. 3,379,489, or FIG. 2 of 3,376,381.

These oculars 12 are supported by the housing at 10J to have their optical axes 12AL and 12AR laterally displaced such that they pass approximately through the respective centers of the eyes E of a normal viewer looking thereinto and to make a predetermined and operative angle $\theta$ with respect to each other. It is found that $\theta$ can be zero or as great as 30° without introducing distortion which is very noticeable, if things are otherwise practiced as set forth herein. This is true since it represents a linear displacement of tan $\theta/2$ and for these values $\theta/2 \cong \tan \frac{1}{2}$ (i.e. 15° equals 0.262 radian and tan 15° equals 0.268).

There is a first reflecting means 14 operatively supported by the housing at 10E in relation to the lens means 11, at 11R, whereby the rays of light reflected by the beam splitting mirror means 13 form a first image of the object plane 11P at the focal plane 12FR of one of said oculars 12. In the instant most contemplated form of the invention the image size divided by the object size (i.e. the magnification) is approximately 2; so, lens means 11 is made up of two sub-elements 11R and 11L; however, as set forth hereinabove the "magnification" could have been chosen as 4 enabling the use of only one sub-element for lens means 11.

There is a second reflecting means 15 operatively supported by the housing, at 10D, in relation to the lens means 11, at 11L, whereby the rays of light transmitted by the beam splitting mirror means 13 form a second image of the object plane 11P at the focal plane 12FL of the other of said oculars 12 with the optical center 11C of the second image laterally displaced from the optical center 11C' of the first image such that the eyes E can merge the two virtual images of 11C and 11C' at M on the virtual image surface 12D to merge the two images at focal planes 12FR and 12FL into a single panoramic image upon virtual image surface 12D. It is again pointed out that as set forth hereinabove in the instant most contemplated form of the invention the magnification is approximately 2; so, lens means 11 is made up of two sub-elements 11R and 11L; however, this "magnification" could have been chosen as 4 to enable a single lens between 13 and 11P. Also in the instant most contemplated form of the invention means 15 is made up of two sub-elements, mirrors 15A and 15B; however, a single prismatic reflecting means could have been chosen to accomplish the same function after this function is clearly pointed out by the present disclosure. It can also be seen that the virtual image surface 12D, as merged at M, could be a distance, anywhere between 10 inches and infinity, from eyes E without departing from the spirit and scope of the present invention; so, the convergence angle (at M) could be zero, but this is hard to illustrate.

The two halves of the housing 10 are, of course, fastened together by way of well known fastening means at 10A (i.e. by screws or as set forth in my said Ser. No. 560,531), with the respective elecents 11, 12, 13, 14, 15, and 21 respectively sliding into openings 10C, 10J, 10B, 10E, 10D, and 10H of both halves.

There is a means 20 of maintaining a picture at the illuminated object plane 11P (this means could be made cylindrical so that SFL' and SFR' form a cylindrical surface such as that of 3,424,511). This means 20 is formed in the housing by 10F with openings 10G allowing light from diffusing screen 21 to illuminate 11P and the rays to pass from 11P to 13. It is clear that there are other equivalent means of maintaining an illuminated image such as a television tube or some sort of an image projection system.

It can be seen that a so called "distortion-free," non-fisheye-type picture (such as those used in the "Pani-Vue" "Bi-Lens" viewer) will be seen to have a tremendous amount of pincushion distortion when placed in means 20 and viewed at virtual image surface 12D because a "distortion-free" non-fisheye-type picture has the following relation:

$$\tan \theta \cong K'y' \quad (2)$$

where $\phi$ is the angle an entrance ray makes with the optical axis of the taking lens; K' is approximately constant; and y' is the distance from said optical axis measured along the image plane of the taking lens to the point of focus of said entrance ray upon said image plane.

Therefore, what is needed is a picture with the following relation:

$$\theta \cong K'y' \quad (3)$$

where the respective terms are as defined for Equation 2.

Since the magnification of means 11 is chosen to be 2, the ideal relation for the picture SF is:

$$\theta \cong 2Ky' \quad (4)$$

where K is as described for Equation 1 and $\phi$ and y' are as described for Equation 3. Also, $\phi$ is substantially as described in Equation 1.

The relation of Equation 3 is substantially achieved by a fisheye-type lens 16, having the desirable astigmatic characteristics over some 180° of view (see also my U.S. Pat. 3,376,381, column 5, lines 51–75 and column 6, lines 1–9), such as, also, the "Nikon Fisheye" "Kenko Fisheye Conversion," or the original Hill fisheye. Generally such a lens 16 has a front negative meniscus element 19, a diaphragm 18, and a focusing lens means 17. These elements can, of course have varying characteristics as long as Equation 3 is substantially achieved.

If, for example, $K' = 5K$ (as is substantially true for the "Nikon" fisheye), Equation 4 could be readily attained by simply enlarging the picture (to be placed into means 20) rectilinearly 2½ times; however, it would be the most desirable if the fisheye lens is designed whereby Equation 4 holds true with no enlargement because, if for example, oculars 12 have a power of 6¼ and means 11 a magnification of 2, then the virtual image at 12D would be some 12.5 as large, at the standard assumption of 10 inches from the eyes E, as SF placed at 11P. The best color film found to be readily available on the market has a resolution of only 85–95 lines/millimeter (through black and white "mimrofilm" or expensive "custom made" color film can have much greater resolution). If this is enlarged 12.5 times, the resolution (as seen at surface 12D from 85–95 lines/mm. at plane 11P) becomes 6.8–7.6 lines/millimeter, at the standard assumption of 10 inches from the eyes E, which is approaching the resolution of the eye, i.e. this is equivalent to printing resolution of 173–193 lines per inch.

So, ideally non-distorted real objects S as they would fall upon a substantially spherical object "plane" or surface 16P of fisheye lens 16 are recorded at substantially flat image plane 16D as image SF having fisheye-type astigmatic-free barrel distortion with substantially the relation of Equation 4 to approach the high resolution of 85–95 lines/mm.

With panoramic viewing device V uniquely constructed deliberately to have its now clearly beneficial result that was heretofore (before applicant's invention) totally unexpected and as is clear from hereinabove, one can place the record of image SF in means 20 and device V produces: virtual image SFL of the left part of SF which is magnified by some 2 to produce real image SFL' at focal plane 12FL with optical center 11C as described hereinabove; virtual image SFR of the right part of SF which is magnified by some 2 to produce real image SFR' at focal plane 12FR with optical center 11C' as described hereinabove; centers 11C and 11C' of real images SFL' and SFR' respectively are merged at point M of virtual image surface 12D and the eyes see what appears to be a merged virtual panoramic image, with virtual objects S' falling upon substantially spherical virtual image surface 12D as they would fall upon substantially spherical object surface 16P, reconstructed which is practically free from distortion. (Of course, these "spherical surfaces," 12D and 16P, are used to graphically illustrate the meaning and significance of Equations 1, 2, 3, and 4.) Clearly the same effect would be produced if elements 13, 14, and 15 were omitted and SFR and SFL were made real rather than virtual with elements 11 relocated accordingly therefor.

It can be seen that at M, the angle to the center of each of eyes E is $2oc$; therefore, the following is true:

$$d \cong (\tfrac{1}{2}\theta + oc)/K, \quad (5)$$

where $d$ is the distance between optical centers 12C and 11C or between optical centers 12C' and 11C', K is as defined for Equation 1 and the other terms are as defined hereinabove. If M is 10 inches from eyes E, of coure, $oc$ would be some 7.15° while if M is an infinite distance from eyes E, $oc$ would be 0°; so, if $\theta$ is 30°, $d$ could be from $(22.15°)/K$ to $(15°)/K$. Even so it is found that $\theta$ can be as much as 30° and it is hard to notice distortion with a fisheye-type relation centered upon 11C, as seen through 12L; therefore, Equation 1 is substantially accurate with regard to point 11C even if $\theta$ is as great as some 30°.

It can now be seen that panoramic views having angles of view greater than 145° can be presented by way of the present device and there is nothing actually to stop them from being as great as 180°, but angles of view as low as 85° (42.5° off the optical axis) are also within the spirt and scope since astigmatic aberration was heretofore considered to limit the focal plane utility to a maximum distance of $(42.5°)/K$ off its optical center because any picture known heretofore to nullify the distortion of the wide-angle ocular had unacceptable astigmatic aberration at angles greater than 42.5° off the optical axis of the taking lens, according to the prior art.

I claim:

1. A wide angle panoramic viewing device for re-creating substantially distortion-free panoramic views when used with pictures having fisheye-type barrel distortion the essentials of which are defined by the following relation:

$$\phi' \cong K'y''$$

where $\phi'$ is the angle a ray entering the taking lens makes with the optical axis of the taking lens, $y''$ is the distance along the picture from said taking lens from its optical center to the point of recording said ray, and K' is a characteristic property of the picture having a value which is substantially constant from zero values to large values of $\phi'$ comprising: a housing; a first and second lens means supported by said housing, each said lens means having an object plane and a real image of said object plane with substantially the following predetermined relation:

$$(K'/K)y' \cong y$$

where: $y'$ is the distance from the optical center of said object to the point of origin of a ray upon said object plane and essentially equal to $y''$, $K'/K$ is the predetermined magnification of said lens means, and $y$ is the distance from the optical center of said real image to the point said ray is focused upon said real image; spaced reflecting means optically aligned with each of said first and second lens means whereby the real images form two substantially flat planes with their optical centers laterally displaced and a pair of wide-angle oculars supported at the rear of said housing to have their optical axes laterally displaced such that they pass approximately through the centers of the eyes of a normal viewer looking thereinto and to make predetermined and operative angle with each other, each of said oculars having its focal plane substantially upon a respective one of said real images and having its optical surfaces designed for introducing pincushion distortion the essentials of which are defined by the following predetermined relation:

$$\phi \cong Ky$$

where: $\phi$ is substantially the angle a ray entering one of said eyes makes with a line joining the center of this eye to the optical center of a corresponding said real image and K is a predetermined property of the ocular having a value which remains substantially constant from zero values to large values of $\phi$, whereby the system as a whole introduces pincushion distortion which will nullify the fisheye-type barrel distortion of approximately the K' value; and means for maintaining a picture at the object plane of each said lens means.

2. A wide-angle panoramic viewing device for re-creating substantially distortion-free panoramic views when used with pictures having fisheye-type barrel distortion the essentials of which are defined by the following relation:

$$\phi' \cong K'y''$$

where $\phi'$ is the angle a ray entering the taking lens makes with the optical axis of the taking lens, $y''$ is the distance along the picture from said taking lens as measured from its optical center to the point of recording said ray, and K' is a characteristic property of the picture having a value which is substantially constant from zero values to large values of $\phi'$, comprising: a housing; a lens means supported by said housing and having an object plane and a real image of said object plane with substantially the following predetermined relation:

$$(K'/K)y' \cong y$$

where: $y'$ is the distance from the optical center of said object plane to the point of origin of a ray upon said object plane and essentially equal to $y''$, $K'/K$ is the predetermined magnification of said lens means, and $y$ is the distance from the optical center of said real image to the point said ray is focused upon said real image;

beam splitting mirror means in optical alignment with said lens means and said object plane to produce two real images of said real image by transmitting approximately half the light from said object plane and reflecting approximately the other half of the light from said object plane;

a pair of wide-angle oculars supported at the rear of said housing to have their optical axes laterally displaced such that they pass approximately through the respective centers of the eyes of a normal viewer looking thereinto and to make a predetermined and operative angle with respect to each other, each of said oculars having its optical surfaces designed for introducing pincushion distortion the essentials of which are defined by the following predetermined relation:

$$\phi \cong Ky$$

where: $\phi$ is the angle a ray entering one of said eyes makes with the optical axis of the corresponding ocular and K is a predetermined property of the ocular having a predetermined value which is substantially constant from zero values to large values of $\phi$;

first reflecting means operatively supported by said housing in optical alignment with said lens means and the first of said real images whereby the light reflected by said beam splitting mirror means forms the first real image of said real images at said focal plane of one of said oculars and second reflecting means operatively supported by said housing in optical alignment with said lens means and the second of said real images whereby the light transmitted by said beam splitting mirror means forms the second real image of said real images at said focal plane of the other of said oculars with the optical center of the second real image laterally displaced from the optical center of the first real image such that said eyes can merge the two optical centers into a single point at the virtual image surface of said oculars, thus the system as a whole introduces pincushion distortion which will nullify the fisheye-type barrel distortion of approximately the K' value; and means for maintaining an illuminated picture at said object plane.

3. The device of claim 1 wherein:

$$d \leq (22.15°)/K$$

where $d$ is the distance between said optical center of one of said real images and the respective optical center of the corresponding said focal plane.

4. The device of claim 2 wherein:

$$d \leq (22.15°)/K$$

where $d$ is the distance between said optical center of one of said real images and the respective optical center of the corresponding said focal plane.

5. The device of claim 1 wherein said spaced reflecting means includes: a first reflecting means optically aligned with said first lens means for diverting the light rays passing through said first lens means through a substantial angle in a first direction; a second reflecting means optically aligned with said second lens means for diverting the light rays passing through said second lens means through a substantial angle in a second direction opposite said first direction; and third and fourth reflecting means for diverting the rays from said first and second reflecting means respectively whereby said real images form said two substantially flat planes.

References Cited

UNITED STATES PATENTS

| | | | |
|---|---|---|---|
| 3,298,771 | 1/1967 | Ratliff | 350—133 |
| 2,953,980 | 9/1960 | Montebello | 350—133 |
| 2,955,156 | 10/1960 | Heilig | 350—133 |
| 3,050,870 | 8/1962 | Heilig | 350—135 |
| 3,272,069 | 9/1966 | Ratliff | 350—137 |
| 3,376,381 | 4/1968 | Ratliff | 350—138 |

FOREIGN PATENTS 336,505    2/1936    Italy.

PAUL R. GILLIAM, Primary Examiner

U.S. Cl. X.R.

350—132, 137, 198

UNITED STATES PATENT OFFICE
CERTIFICATE OF CORRECTION

Patent No. 3,516,725                                      June 23, 1970

Harvey L. Ratliff, Jr.

It is certified that error appears in the above identified patent and that said Letters Patent are hereby corrected as shown below:

Column 3, line 19, after "618,977," insert -- now U. S. Patent 3,471,224 --; line 20, "3,471,224" should read -- 3,424,511 --; line 32, "$\theta/2 \cong \tan 1/2$" should read -- $\theta/2 \cong \tan \theta 1/2$ --. Column 4, line 3, "elecents" should read -- elements --; line 23, "$\tan \theta \cong K'y'$" should read -- $\tan \phi \cong K'y'$ --; line 33, "$\theta \cong K'y'$" should read -- $\phi \cong K'y'$ --; line 37, "$\theta \cong 2Ky'$" should read -- $\phi \cong 2Ky'$ --; line 64, "through" should read -- though --; line 64, "minrofilm" should read -- microfilm --. Column 5, line 38, "coure" should read -- course --; line 51, "spirt" should read -- spirit --. Column 6, line 5, "object", first occurrence, should read -- object plane --.

Signed and sealed this 16th day of February 1971.

(SEAL)
Attest:

EDWARD M. FLETCHER, JR.                         WILLIAM E. SCHUYLER, JR.
Attesting Officer                                       Commissioner of Patents